(12) United States Patent
Brentrup

(10) Patent No.: US 6,544,032 B1
(45) Date of Patent: Apr. 8, 2003

(54) METHOD AND INSTALLATION FOR HEAT-TREATING FINE-GRAINED PRODUCTS

(75) Inventor: Ludger Brentrup, Oelde (DE)

(73) Assignee: Krupp Polysius AG, Beckum (DE)

( * ) Notice: Subject to any disclaimer, the term of this patent is extended or adjusted under 35 U.S.C. 154(b) by 0 days.

(21) Appl. No.: 09/937,994

(22) PCT Filed: Sep. 4, 2000

(86) PCT No.: PCT/EP00/08628

§ 371 (c)(1),
(2), (4) Date: Sep. 28, 2001

(87) PCT Pub. No.: WO01/55048

PCT Pub. Date: Aug. 2, 2001

(51) Int. Cl.$^7$ ................................................. F27B 15/00
(52) U.S. Cl. ........................ 432/14; 432/106; 106/761; 106/762
(58) Field of Search ............................ 432/14, 58, 105, 432/106; 106/761, 762

(56) References Cited

U.S. PATENT DOCUMENTS 5,292,247 A * 3/1994 Bauer .......................... 432/106
5,919,301 A * 7/1999 Rother et al. ................ 106/761

FOREIGN PATENT DOCUMENTS

EP 0 854 339 A1 8/1997

* cited by examiner

Primary Examiner—Jiping Lu
(74) Attorney, Agent, or Firm—Muramatsu & Associates

(57) ABSTRACT

A method and apparatus for heat treatment of fine-grained material. In order to reduce the nitrogen oxide content of the exhaust gas from the combustion zone, a region of the calcination zone is operated under reducing conditions and ammonia-containing additives are introduced into the calcination zone. In this case, at least the predominant proportion of the ammonia-containing additives is only added in a region of the calcination zone in which the secondary combustion of the combustion products which are formed in the section operated under reducing conditions but are not completely reacted out is largely concluded.

10 Claims, 1 Drawing Sheet

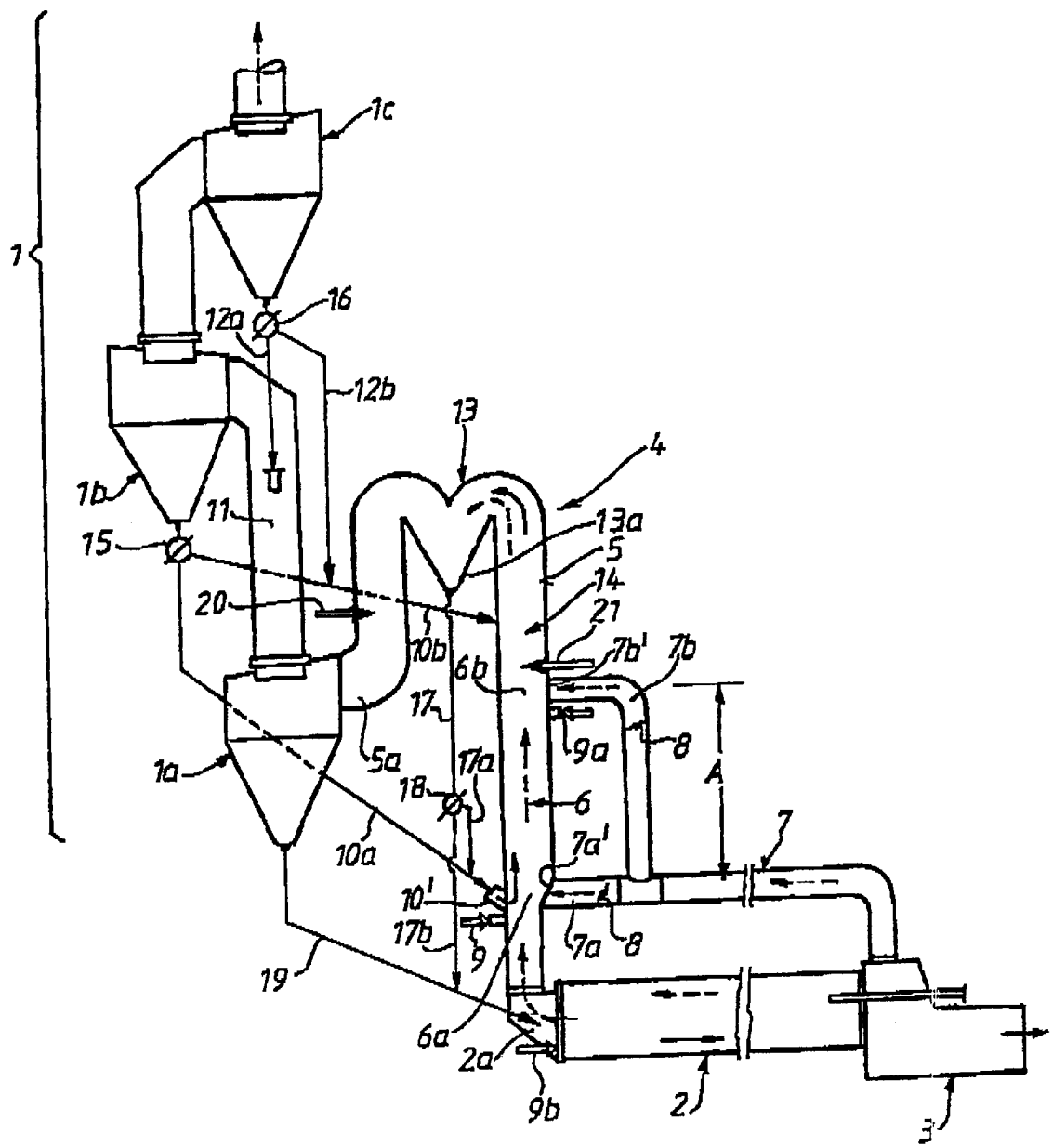

METHOD AND INSTALLATION FOR HEAT-TREATING FINE-GRAINED PRODUCTS

FIELD OF THE INVENTION

The invention relates to a method and to apparatus for the heat treatment of fine-grained material wherein pollutant content of the exhaust gases is reduced by means of ammonia-containing additives.

BACKGROUND OF THE INVENTION

In the heat treatment of fine-grained material, particularly in the production of cement clinker, a substantial proportion of the fuel is already added in the calcination zone. In this case, a very far-reaching deacidification of the preheated material takes place in the calcination zone.

In view of the intensification of environmental conditions, attempts have been made for about a decade to optimize the combustion conditions in the region of the calcination zone in order to reduce the pollutant content of the exhaust gases from the combustion zone, particularly the nitrogen oxide content ($NO_x$). For this purpose, it is known to add a small quantity of fuel (at most approximately 10% of the total quantity of fuel) to the combustion zone in the inlet region in order to produce a reducing atmosphere in the uptake pipe which forms the calcination zone. The rest of the calcination fuel then burns with sub-stoichiometric addition of air. Complete secondary combustion of CO and other flue gas constituents takes place in a section of the calcination zone located above an inlet for exhaust air from the cooling zone (tertiary air).

In order to set a defined temperature window which is necessary for optimal $NO_x$ reduction, the addition of the preheated material as well as the delivery of the exhaust air from the cooling zone is carried out in stages. In this case, the lower introduction point for material and air lies approximately at the height of the fuel delivery to the calcination zone, and the second introduction point for the preheated material is located above the upper (second) inlet for the exhaust air from the cooling zone.

Such a method is the subject of EP 0 854 339 A1 filed by the present applicants. In that method, first of all, a hot reducing region for $NO_x$ reduction and then a hot oxidizing region for the breakdown of unburnt flue gas constituents are created in the calcination zone in the direction of flow of the gases.

According to a further proposal made in EP 0 854 339 A1, it may sometimes be advantageous if in addition ammonia ($NH_3$), a corresponding ammonia solution or an effective additive is injected into the reaction chamber of the calcination zone for the purpose of further $NO_x$ reduction (so-called SNCR process, cf. "World Cement", March 1992, pages 2 to 4). In this variant of the method described in EP 0 854 339 A1, the tertiary air branch pipe delivering the upper air is shut off. The combustion of the fuel introduced into the calcination zone takes place in an oxidizing atmosphere. The dosaged addition of $NH_3$ or similar agents is carried out after the delivery of the fuel and tertiary air. In this case, the optimal temperature window for the SNCR process is set by the distribution of the preheated material. An additional burner disposed in the kiln inlet (inlet region of the combustion zone) remains in operation. Since the $NO_x$ coming from the combustion zone is thereby partially reduced, the quantity of added $NH_3$ can be kept lower.

This known prior art which is described above does indeed already constitute a marked improvement over earlier proposed solutions. However, there is a need for further developments to lower the $NO_x$ level even more.

SUMMARY OF THE INVENTION

It is, therefore, an object of the present invention to provide a method and apparatus for heat treatment of fine-grained material so that the $NO_x$ emission level is lowered even more drastically than hitherto, and at the same time, the consumption of ammonia-containing additives is reduced and the utilization of fuel in the calcination zone is improved.

This object is achieved according to the invention in that at least the predominant proportion of the ammonia-containing additives is only added in a region of the calcination zone in which the secondary combustion of the combustion products which are formed in the section which is operated under reducing conditions but are not completely reacted out is largely concluded.

Advantageously in this method;

a) the exhaust air from the cooling zone is introduced in two branch air streams at different points into the calcination zone, the delivery of the air and fuel being set in such a way that the section of the calcination zone lying between the first and second introduction points is also operating under reducing conditions, and b) the ammonia-containing additives are only introduced into a section of the calcination zone which is operated under oxidizing conditions and adjoins the section operated under reducing conditions.

Unlike the above-mentioned variant of the method described in EP 0 854 339 A1 (in which as $NH_3$ is added, the tertiary air branch pipe delivering the upper air is shut off), in the method according to the invention, due to the staged delivery of tertiary air, a large part of the length of the kiln exhaust gas pipe is operated as a reduction zone. Thus, even before the ammonia-containing additives come into effect, a very drastic reduction of the $NO_x$ content of the flue gases can take place in this region. This preliminary lowering of the basic level of $NO_x$, together with a targeted adjustability of the reaction conditions in the calcination zone, particularly by the choice of an optimal temperature window and a favorable $O_2$ content, makes possible a very effective further lowering of the $NO_x$ content with a reduced consumption of ammonia-containing additives as well as a favorable utilization of fuel in the calcination zone.

If the preheating zone is formed by a plurality of cyclone stages which are disposed one above the other and through which the material to be preheated passes in succession from top to bottom, then in an advantageous embodiment of the method according to the invention, the stream of material coming from the second-lowest cyclone stage is divided into two branch streams, of which the first branch stream is introduced into the section of the calcination zone which is operated under reducing conditions, preferably approximately at the height of the first introduction point for exhaust air from the cooling zone, whilst the second branch stream is introduced into the section of the calcination zone which is operated under oxidizing conditions, preferably above the second introduction point for exhaust air from the cooling zone.

The branch streams of the preheated material and the quantities of air are advantageously calculated so that in the section of the calcination zone which is operated under oxidizing conditions and adjoins the section of the calcination zone which is operated under reducing conditions, the gas temperature is between 900 and 950° C. and the $O_2$ content is between 3 and 5%.

The secondary combustion of the combustion products (CO, hydrocarbons, etc.) which are formed in the section of the calcination zone which is operated under reducing conditions also takes place in the section of the calcination zone which is operated under oxidizing conditions. OH radicals are necessary for this. However, these OH radicals are also necessary for the reduction process proceeding with the ammonia-containing additives. Thus, in the section of the calcination zone which is operated under oxidizing conditions, there is a competition situation which is unfavorable either for the $NO_x$ reduction or for the CO secondary combustion.

If at least the predominant proportion of the ammonia-containing additives is only added in a region of the calcination zone in which the secondary combustion of the combustion products which are formed in the section operated under reducing conditions but are not completely reacted out is largely concluded, then the competition situation described above can be effectively neutralized.

If the calcination zone comprises an ascending branch adjoining the combustion zone, a deflection zone and a descending branch, then for the reasons explained above, at least the predominant proportion of the ammonia-containing additives is only added in the descending branch of the calcination zone, preferably at the end thereof. However, a small proportion of the ammonia-containing additives can already be added in the ascending branch of the calcination zone above the second introduction point for the exhaust air from the cooling zone. This last-mentioned possibility will be used, for example, when because of the fuel situation only a relatively small proportion of combustion products which are not completely reacted out from the reducing section enters the oxidizing section of the calcination zone or when the secondary combustion of these combustion products takes place particularly quickly for other reasons.

In order to set the temperatures for the $NO_x$ reduction optimally, it may be advantageous in the method according to the invention to divide the material stream coming from the third-lowest cyclone stage into two branch streams, of which one branch stream is introduced into the gas stream leading to the second-lowest cyclone stage and the other branch stream bypasses the second-lowest cyclone stage and is introduced together with the second branch stream of material coming from the second-lowest cyclone stage into the section of the calcination zone operated under oxidizing conditions, preferably above the second introduction point for the exhaust air from the cooling zone. Such routing of the material does indeed result overall in higher gas temperatures in the calcination zone and a somewhat less economical use of heat, but it does permit optimal setting of the temperature window for the $NO_x$ reduction.

The method parameters, particularly the quantities of fuel added in the inlet region to the combustion zone and in the region of the section of the calcination zone which is operated under reducing conditions as well as the quantity of ammonia-containing additives added in the region of the section of the calcination zone which is operated under oxidizing conditions, are advantageously calculated so that overall 70 to 80% of the lowering of the nitrogen oxide content is achieved in the reducing regions and up to 30% in the oxidizing region. Thus in this case, the basic lowering of the $NO_x$ content is carried out as far as possible in the region of the calcination zone which is operated under reducing conditions (so-called MSC process), whilst the fine control of an operating value lying as close as possible to the necessary limiting value takes place by the addition of ammonia-containing additives (so-called SNCR process).

In this case, it is essential for the achieved solution that within the calcination zone the two said steps are separated as far as possible from one another both spatially and in terms of time: at least the predominant proportion of the ammonia-containing additives only comes into effect in a region of the calcination zone in which the necessary follow-on effect of the section which is operated under reducing conditions, namely the secondary combustion of the combustion products which are not completely reacted out, is largely concluded.

BRIEF DESCRIPTION OF THE DRAWING

An embodiment of apparatus for carrying out the method according to the invention is illustrated schematically in FIG. 1.

DETAILED DESCRIPTION OF THE INVENTION

The illustrated apparatus contains, as a preheating zone for the fine-grained material, a cyclone preheater 1 through which hot gases flow upwards from the bottom and which has a plurality of cyclone stages disposed substantially one above the other. For the sake of simplicity, only the lowest cyclone stage 1a, the second-lowest cyclone stage 1b and the third-lowest cyclone stage 1c are shown in the drawing.

For the final burning of the preheated material, a combustion zone in the form of a rotary kiln 2 is provided, and disposed after this in the flow direction of the material is a cooler 3 which forms the cooling zone of the apparatus.

In the drawing, solid arrows symbolize the material to be treated and its flow direction, whilst broken arrows indicate the gas streams and their flow direction.

A calcination zone 4 through which the hot exhaust gases from the rotary kiln 2 flow according to the broken arrows is disposed between the rotary kiln 2 and the cyclone preheater 1. This calcination zone 4 comprises an ascending branch (uptake pipe) of the kiln exhaust gas pipe, a descending branch 5a and a deflection chamber 13 disposed therebetween.

A reaction chamber 6 to which a tertiary air pipe 7 coming from the cooler 3 is connected at two points is constructed above the kiln inlet 2 in the ascending branch 5 of the kiln exhaust gas pipe; a tertiary air branch pipe 7a is connected to the lower end region 6a of the reaction chamber 6 at a connection point 7a' and behind a lower fuel supply 9 in the flow direction of the kiln exhaust gases represented by broken arrows; a second tertiary air branch pipe 7b is connected to the upper end region 6b of the reaction chamber 6 at a connection point 7b'. A second fuel supply 9a can be provided just below this connection point 7b' for the so-called upper air. Valves 8 for adjusting the quantities of air are provided in the tertiary air branch pipes 7a, 7b.

The vertical distance A between the two tertiary air connection points 7a', 7b' determines the length of the reaction chamber 6. The gas residence time in the reaction chamber 6 between the end regions 6a and 6b is advantageously set to approximately 0.5 to 1 s by the choice of the length of the reaction chamber 6. In this case, a reducing atmosphere is maintained in the reaction chamber 6 for the reduction of the $NO_x$ content of the exhaust gases from the rotary kiln.

Preheated material from the second-lowest cyclone stage 1b of the cyclone preheater 1 is introduced via a divider arrangement 15 and two material pipes 10a, 10b into the ascending branch 5 of the calcination zone 4. In this case, the material pipe 10a is connected to the lower end region 6a of the reaction chamber 6 at a connection point 10', whilst the material pipe 10b is connected to the uptake pipe of the calcination zone 4 markedly above the connection point 7b', i.e. above the upper end region 6b of the reaction chamber 6.

The preheated material from the third-lowest cyclone stage 1c is likewise divided by a divider arrangement 16 into two part-quantities which are conveyed as follows through material pipes 12a, 12b: the part-quantity conveyed by the material pipe 12a proceeds into the connecting pipe 11 which leads from the cyclone stage 1a to the cyclone stage 1b. Thus in the usual manner, this part-quantity of material passes through the second-lowest cyclone stage 1b after the third-lowest cyclone stage 1c. The other material pipe 12b conveys the part-quantity of material routed through it, bypassing the second-lowest cyclone stage 1b, into the material branch stream which is conveyed by the material pipe 10b into the section of the calcination zone 4 which is operated under oxidizing conditions.

The deflection chamber 13 is provided with a precipitator 13a. A material pipe 17 connected to this precipitator 13a branches via a divider 18 into two branch pipes 17a, 17b. Of these, the pipe 17a opens into the material pipe 10a coming from the second-lowest cyclone stage 1b, so that this material stream is led out of the branch pipe 17a at the connection point 10' back into the calcination zone 4. The branch pipe 17b conveys the material transported by it into the kiln inlet 2a of the rotary kiln 2, into which the material discharged from the lowest cyclone stage 1a also proceeds via a material pipe 19.

A burner 9b for producing a reducing atmosphere in the lowest region of kiln uptake pipe is provided in the kiln inlet 2a.

The region of the calcination zone which lies above the upper end region 6b of the reaction chamber 6 and is operated under oxidizing conditions is designated by 14.

The apparatus according to the invention contains suitable arrangements for introducing $NH_3$ or other ammonia-containing additives into the calcination zone at at least one point on the calcination zone 4, but preferably at two points. A first $NH_3$ introduction point 20 is located close to the lower end of the descending branch 5a of the calcination zone 4, i.e. just before the connection of this pipe to the lowest cyclone stage 1c.

A second $NH_3$ introduction point 21 is located in the ascending branch 5 of the calcination zone 4, above the connection point 7b' of the tertiary air (upper air) but below the point at which the material pipe 10b opens into the region 14 of the calcination zone 4 which is operated under oxidizing conditions.

The predominant proportion of the $NH_3$ or other ammonia-containing additives is added at the introduction point 20, i.e. in a region in which the secondary combustion of the combustion products which are formed in the section which is operated under reducing conditions (i.e. in the reaction chamber 6) but are not completely reacted out is largely concluded. The secondary combustion of these combustion products from the reaction chamber 6 which are not completely reacted out begins at the height of the connection point 7b' of the tertiary air (upper air), continues in the deflection chamber 13 and ends in the descending branch 5a of the calcination zone 4. Therefore, at the height of the $NH_3$ introduction point 20, there are sufficient OH radicals available for the reduction process proceeding with the $NH_3$.

Depending upon the given fuel ratios and the combustion conditions which are set accordingly in the region 14, it may be appropriate in individual cases to add a generally smaller part-quantity of the $NH_3$ or other ammonia-containing additives already at the introduction point 21 at which the secondary combustion of the combustion products which originate from the section which is operated under reducing conditions and are not completely reacted out is not yet concluded.

By division of the quantities of material between the material pipes 10a and 10b, an optimal temperature window between 900 and 950° C. is created in the region 14 of the calcination zone 4 which is operated under oxidizing conditions. Above the upper limiting value, the combustion of the reduction agent (with additional NO formation) increases, below it, the $NH_3$ slip increases (thus a secondary emission occurs).

If the $NH_3$ or other ammonia-containing additives are injected at the introduction points 20 (and possibly also 21) into the calcination zone 4 downstream of the connection point 7b' of the upper air pipe, then an optimal oxygen content between 3 and 5% can be ensured in this region 14 which is operated under oxidizing conditions. Since with regard to the OH radicals the described competition situation between the reduction process proceeding with $NH_3$ or with other ammonia-containing additives and the secondary combustion of the combustion products which are formed in the reaction chamber 6 and are not completely reacted out exists in the region 14 which is operated under oxidizing conditions, in order to neutralize this competition situation, the addition of the main proportion of the $NH_3$ or of the other ammonia-containing additives only takes place at the introduction point 20 at which the secondary combustion of the combustion products which are not completely reacted is largely concluded.

What is claimed is:

1. A method of heat treatment of fine-grained material for production of cement clinker from cement raw material, comprised of the following steps of:

preheating the material in a preheating zone by means of hot gases;

further heating the preheated material and at least largely calcinating the preheated material in a calcination zone through which hot exhaust gases from a combustion zone flow and which is supplied with additional fuel;

burning the calcined material in a combustion zone and cooling the burnt material in a cooling zone, exhaust air from the cooling zone being introduced as combustion air into the calcination zone;

operating at least an inlet region to the combustion zone under reducing conditions by addition of additional fuel to reduce nitrogen oxide content of the exhaust gas from the combustion zone;

introducing ammonia-containing additives, in order further to reduce the nitrogen oxide content, into the gas stream of the calcination zone which is produced after introduction of exhaust air from the cooling zone into the exhaust gas from the combustion zone and is supplied with additional fuel;

wherein at least the predominant proportion of the ammonia-containing additives is only added in a region of the calcination zone in which the secondary combustion of the combustion products which are formed in a section which is operated under reducing conditions but are not completely reacted out is largely concluded.

2. A method as claimed in claim 1, wherein the step of further heating the preheated material includes a step of introducing the exhaust air from the cooling zone in two branch air streams at different points into the calcination zone, delivery of the air and fuel being set in such a way that a section of the calcination zone lying between first and second introduction points is also operating under reducing conditions, and the step of introducing the ammonia-containing additives includes a step of introducing the ammonia-containing additives only into a section of the calcination zone which is operated under oxidizing conditions and adjoins the section which is operated under reducing conditions.

3. A method as claimed in claim 2, wherein the step of preheating the material is performed in the preheating zone which is formed by a plurality of cyclone stages which are disposed one above the other and through which the material to be preheated passes in succession from top to bottom, and wherein a stream of material coming from the second-lowest cyclone stage is divided into two branch streams, of which a first branch stream is introduced into the section of the calcination zone which is operated under reducing conditions approximately at a height of the first introduction point for exhaust air from the cooling zone, whilst a second branch stream is introduced into the section of the calcination zone which is operated under oxidizing conditions above the second introduction point for exhaust air from the cooling zone.

4. A method as claimed in claim 3, wherein the step of preheating the material is performed in the preheating zone in which the material stream coming from the third-lowest cyclone stage is divided into two branch streams, of which one branch stream is introduced into the gas stream leading to the second-lowest cyclone stage and the other branch stream bypasses the second-lowest cyclone stage and is introduced together with the second branch stream of material coming from the second-lowest cyclone stage into the section of the calcination zone which is operated under oxidizing conditions above the second introduction point for the exhaust air from the cooling zone.

5. A method as claimed in claim 3, wherein the step of further heating the preheated material includes a step of calculating the branch streams of the preheated material and quantities of air so that in the section of the calcination zone which is operated under oxidizing conditions and adjoins the section of the calcination zone which is operated under reducing conditions, so that gas temperature is between 900 and 950° C. and $O_2$ content is between 3 and 5%.

6. A method as claimed in claims 2, wherein the step of introducing the ammonia-containing additives includes a step of adding a small proportion of the ammonia-containing additives in an ascending branch of the calcination zone above the second introduction point for the exhaust air from the cooling zone.

7. A method as claimed in claim 1, wherein the step of further heating the preheated material is performed in the calcination zone which comprises an ascending branch adjoining the combustion zone, a deflection zone and a descending branch, and wherein at least the predominant proportion of the ammonia-containing additives is only added in the descending branch of the calcination zone at the end of the descending branch.

8. A method as claimed in claim 7, wherein the step of introducing the ammonia-containing additives includes a step of adding a small proportion of the ammonia-containing additives in the ascending branch of the calcination zone above the second introduction point for the exhaust air from the cooling zone.

9. A method as claimed in claim 1, further comprising a step of calculating parameters, particularly quantities of fuel added in the inlet region to the combustion zone and in the region of the section of the calcination zone which is operated under reducing conditions as well as quantity of ammonia-containing additives added in the region of the section of the calcination zone operated under oxidizing conditions so that overall 70 to 80% reduction of the nitrogen oxide content is achieved in the reducing regions and up to 30% reduction of the nitrogen oxide content is achieved in the oxidizing region.

10. An apparatus for heat treatment of fine-grained material for production of cement clinker from cement raw meal, comprising:

a preheating zone for preheating the material by hot gases;

a calcination zone through which hot gases from a combustion zone flow and which is supplied with additional fuel for further heating and at least largely calcining the preheated material;

a combustion zone for final burning of the calcined material as well as a cooling zone for cooling the burnt material, exhaust air from the cooling zone being introduced as combustion air into the calcination zone;

a burner provided in an inlet region of the combustion zone for addition of additional fuel for reducing nitrogen oxide content of exhaust gas from the combustion zone by reducing operation at least of the inlet region to the combustion zone; and means for introducing ammonia-containing additives into the calcination zone in order further to reduce the nitrogen oxide content of the gas stream which is produced after introduction of exhaust air from the cooling zone into the exhaust gas from the combustion zone;

wherein means for introducing ammonia-containing additives are constructed and disposed in such a way that at least the predominant proportion of the ammonia-containing additives is only added in a region of the calcination zone in which the secondary combustion of the combustion products which are formed in the section which is operated under reducing conditions but are not completely reacted out is largely concluded.

* * * * *